Jan. 4, 1944. J. A. LOFGREN 2,338,289
PIERCING AND SHEARING TOOL
Filed Sept. 4, 1943
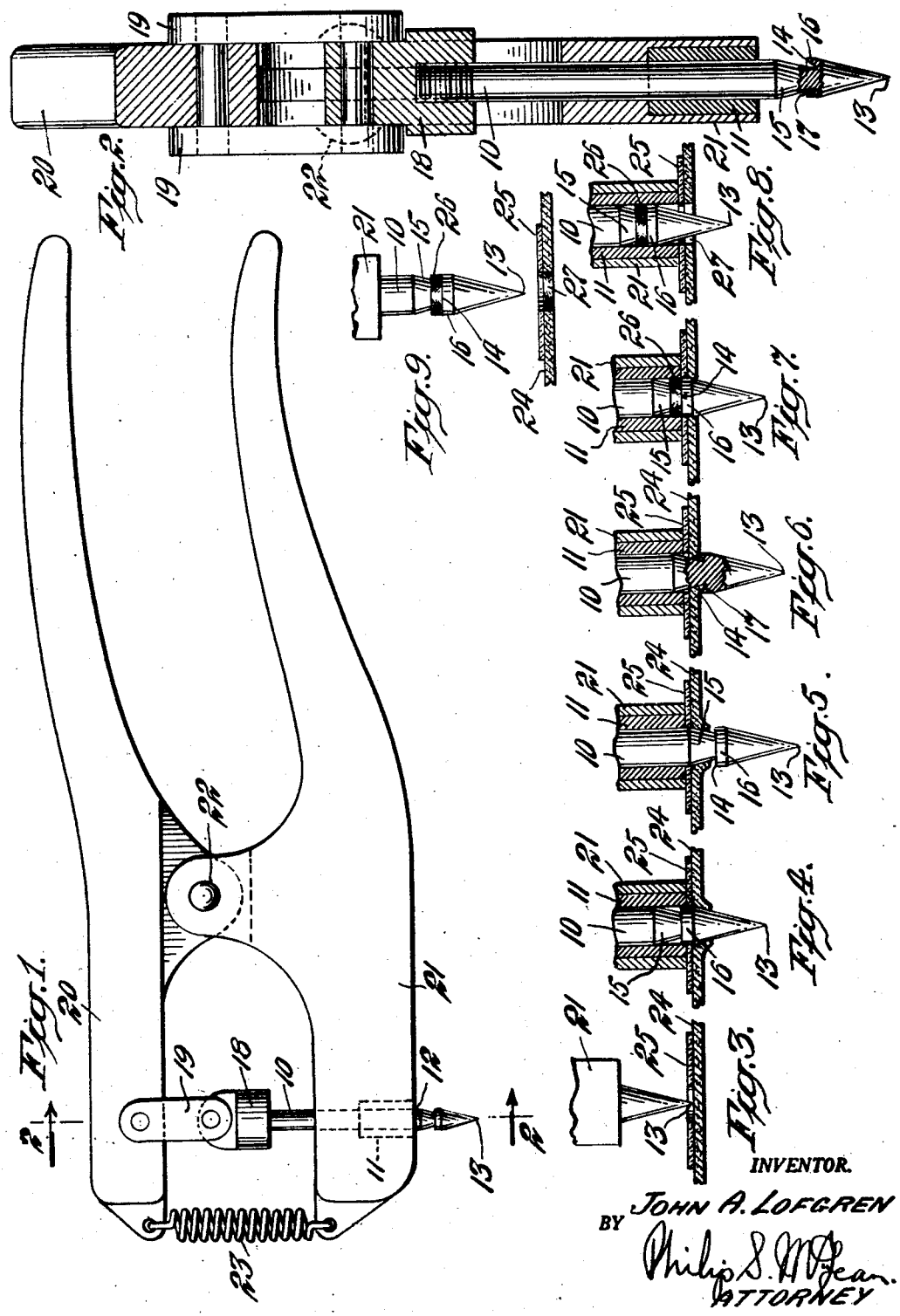
INVENTOR.
JOHN A. LOFGREN
BY Philip S. McLean
ATTORNEY Patented Jan. 4, 1944

2,338,289

UNITED STATES PATENT OFFICE 2,338,289

PIERCING AND SHEARING TOOL

John A. Lofgren, Wichita, Kans., assignor to Beech Aircraft Corporation, Wichita, Kans., a corporation of Delaware Application September 4, 1943, Serial No. 501,321

3 Claims. (Cl. 164—121)

The invention here disclosed relates to the perforating of sheet materials in the nature of cloth, leather and the like.

Special objects of the invention are to accomplish the formation of openings with clean-cut edges where the material to be perforated is accessible at only one side.

A particular application of the invention is for the formation of drain holes in fabric covered airplane structures. These drain openings are necessary for escape of accumulated moisture. The usual practice has been to cement a washer-like grommet in place and then using this grommet as a guide, to cut through the fabric with a drill or piercing tool. This method is slow and likely to damage the underlying primary members of the fabric covered structure and leaves the fabric with rough-cut edges, liable to ravel and otherwise deteriorate, or to clog up the hole.

Special objects are to eliminate and overcome such objections and to provide a simple, practical form of device by which these drain openings can be quickly formed without injury of the material or underlying structure and so as to leave the material with smooth, clean-cut edges.

Other desirable objects and the novel features by which all purposes of the invention are attained are set forth or will be apparent from the following specification.

The drawing illustrates a present commercial embodiment of the invention. Actual physical structure, however, may be modified and changed, all within the true intent and broad scope of the invention as hereinafter defined and claimed.

Fig. 1 in the drawing is a side elevation of a piercing and shearing tool incorporating features of the invention.

Fig. 2 is an enlarged transverse sectional view of the same as on substantially the plane of line 2—2 of Fig. 1.

Figs. 3 to 9 are broken sectional details illustrating successive stages in the piercing, shearing and removal of material from the cut opening.

Basically, the invention comprises a punch plunger 10 operating in a guide 11 having a shearing edge 12, said plunger having a piercing point 13 and at the base of that, a shoulder 14 cooperable with the edge 12 to form a shearing couple.

The shoulder 14 is provided by reducing the plunger, back of the point in a tapered shank portion 15. The taper of this shank may be the same as or approximate that of the piercing point. Preferably it should be sufficient in longitudinal extent to accommodate the wad of material removed from the pierced sheet.

For the purpose of providing a renewable edge which can be readily sharpened, the plunger is shown as formed with a circular land 16 at the base of the tapered piercing point, the upper edge of this land providing the cutting shoulder 14. A true shear cut is accomplished in the tool illustrated by reason of the inclination of the cutting shoulder 14 inwardly, in the direction of the piercing point, as indicated at 17.

In the tool illustrated, the plunger stem is equipped with a head 18 pivotally connected by links 19 with one hand lever 20, and the guide and companion cutter is in the form of a bushing set in an opposed hand lever 21, the two levers being pivotally connected at 22 and having a spring 23 drawing them together in a manner to normally project the piercing point, as in Fig. 1.

It is contemplated, however, that other forms of handle and operating structures may be utilized and that the punch may be power operated, as well as hand operated.

Figs. 3 to 9 illustrate successive stages in the piercing and punching of a sheet of material 24, such as aircraft fabric, to which a drain grommet 25 has been applied.

Fig. 3 shows how the tool may be used, in the condition illustrated in Fig. 1; that is, with the point projected under the pull of the spring, by centering the point in the grommet hole. As pressure is applied, the point, which may be needle sharp, will penetrate the material, as in Fig. 4; and, with such additional pressure as may be necessary, applied, for example, through lever 20, the point will be forced entirely through the material, with the land 16 and cutting shoulder 14 pasing clear through to the opposite side, as in Fig. 5. The sudden release of tension on the stretched material, afforded by the tapered shank portion 15, permits the material about the pierced opening to collapse or shrink back over the cutting shoulder after the manner indicated in Fig. 5. Then, with retractive movement of the plunger, accomplished in this instance by squeezing the handles together, the material back of the shoulder, collected and held by the inward inclination of that shoulder, will be sheared off at the companion shoulder 12, as illustrated progressively in Figs. 6 and 7.

Fig. 8 shows how the plunger may be fully retracted within the guide to lift the wad 26 of cut material clear out of the cut hole 27 and grommet 25, and Fig. 9 shows how then, after removing the piece from the clean-cut hole, the plunger may be projected to expose the ring 26 of cut material for removal from the plunger. This annular wad is ordinarily easily releasable from the plunger, but if it still possesses sufficient strength to offer appreciable resistance to removal, it may be stretched to the point where it will break or may be easily slipped down over the cutting shoulder, by simply pulling it up over the incline of the tapered shank 15.

The invention provides a simple, easily operated mechanism by which clean edged openings for drainage or other purposes can be quickly produced in aircraft fabrics or other sheet materials, while working wholly from only one side of such material. The spring, arranged as shown, acts on the hand levers to normally project the point, thus to hold it exposed, ready for use and to automatically extend it for discharge of the cut material. The acute angle of the shearing shoulder exerts an effect of gathering, collecting and compacting the material to be removed and to leave the cut edges in a clean, firm condition. The effect of cleaning the hole is also accomplished in part by the circular land passing therethrough, following the cutting edge.

What is claimed is:

1. A piercing and shearing tool, comprising in combination, a plunger having a piercing point, a cutting shoulder at the base of said point and a reduced stem back of said shoulder, a guide in which said plunger operates, said guide having a cutting edge for cooperation with said cutting shoulder and means for effecting reciprocation of said plunger in said guide to project said piercing point and cutting shoulder beyond said cutting edge and to carry said cutting shoulder back into cooperative relation with said cutting edge, said reduced stem portion being tapered toward said cutting shoulder.

2. A tool for forming clean-cut drain holes in airplane fabric and the like, comprising a guide and a punch reciprocating therein, said punch having a piercing point, a shearing shoulder at the base of said point and a reduced stem back of said shoulder, said guide having a cutting edge cooperable with said shearing shoulder and means for shifting said plunger in one direction to project said piercing point, shearing shoulder and reduced stem beyond the cutting edge of said guide and for shifting said plunger in the opposite direction to withdraw the reduced stem into said guide and the shearing shoulder into cooperative relation with said cutting edge, said shearing shoulder being inclined inwardly toward the piercing point and said reduced stem being tapered toward said shearing shoulder.

3. A tool for forming clean-cut drain holes in airplane fabric and the like, comprising a guide and a punch reciprocating therein, said punch having a piercing point, a shearing shoulder at the base of said point and a reduced stem back of said shoulder, said guide having a cutting edge cooperable with said shearing shoulder, means for shifting said plunger in one direction to project said piercing point, shearing shoulder and reduced stem beyond the cutting edge of said guide and for shifting said plunger in the opposite direction to withdraw the reduced stem into said guide and the shearing shoulder into cooperative relation with said cutting edge, said shearing shoulder being inclined inwardly toward the piercing point and said reduced stem being tapered toward said shearing shoulder and a circular land on said plunger at the base of said point, the inner edge of said land constituting the shearing shoulder aforesaid.

JOHN A. LOFGREN.